A. R. J. LAUGER.
Coffee-Roasters.

No. 196,681.  Patented Oct. 30, 1877.

UNITED STATES PATENT OFFICE.

ALBERT R. J. LAUGER, OF MOUNT OLIVET, KENTUCKY.

IMPROVEMENT IN COFFEE-ROASTERS.

Specification forming part of Letters Patent No. 196,681, dated October 30, 1877; application filed April 23, 1877.

*To all whom it may concern:*

Figure 1:
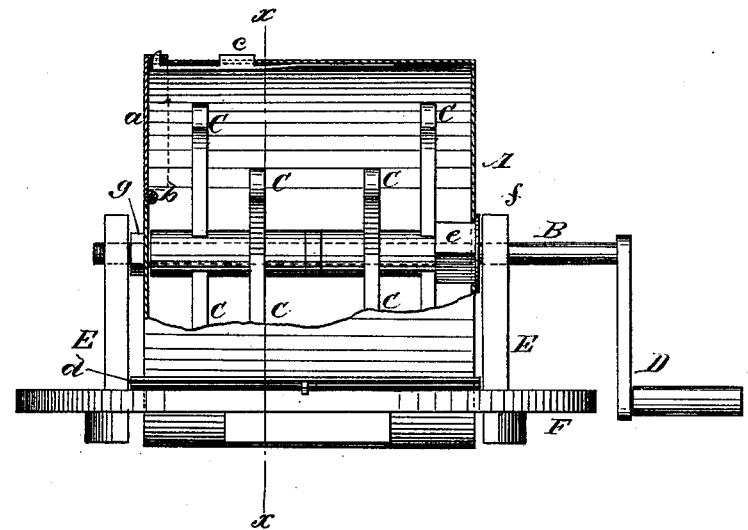
Figure 2:
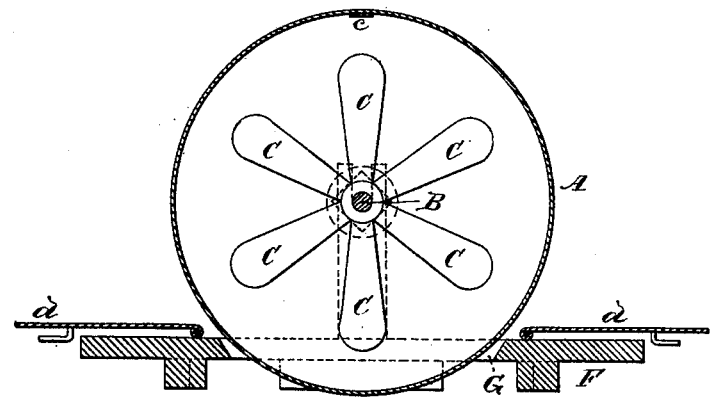

Be it known that I, ALBERT R. J. LAUGER, of Mount Olivet, Robertson county, Kentucky, have invented a new and Improved Coffee-Roaster, of which the following is a specification:

Figure 1 is a side elevation, in part section; and Fig. 2 is a transverse section on line $x\,x$, Fig. 1.

Similar letters of reference indicate corresponding parts.

My invention relates to a machine for roasting coffee and similar articles; and it consists in the construction and arrangement of parts, as hereinafter described and claimed.

In the drawing, A is a cylinder, of sheet-iron or other suitable material, having the shaft B, which extends axially through it, and upon which the arms or rings C are arranged radially at different points in the length of the cylinder. These arms extend nearly to the inner surface of the cylinder A, and serve to thoroughly stir the kernels of coffee or other article as the cylinder is rotated, so that the whole mass is equally acted upon by the heat.

The shaft B is provided with a square hub, $e$, having a collar, $f$, between which and the nut $g$, at the opposite end, the ends of the cylinder A and the arms C are clamped. The shaft is provided with a crank, D, by which it is turned, and it is journaled in posts E, that project upward from the stove-cover F at the sides of the aperture G. These posts are of such length that the cylinder A projects a short distance through the cover F.

A portion, $a$, of the end of the cylinder is hinged at $b$, forming a door, through which articles may be placed in or removed from the cylinder. A spring-catch, $c$, is provided for retaining the door when closed. Doors $d\,d$ are hinged to the cover F at the edges of the aperture G, for closing the same when the cylinder A is removed.

The cover F, when the roaster is in use, is placed on a stove, and the roaster is slowly rotated by means of crank D.

Coffee or other articles roasted in my apparatus are more thoroughly and evenly acted upon by the heat than in roasters of ordinary construction.

Having thus described my invention, I claim as new and desire to secure by Letters Patent—

The combination of the cylinder A, shaft B, arms C, and the apertured cover F, having the posts E and covers $d$, substantially as shown and described.

ALBERT R. J. LAUGER.

Witnesses:
J. C. SMITH,
E. E. PEARCE.